United States Patent
Ruetenik

(10) Patent No.: US 12,507,686 B2
(45) Date of Patent: Dec. 30, 2025

(54) EQUINE SHOE WITH CONCAVE TOPSIDE

(71) Applicant: Monty L. Ruetenik, Clear Lake City, TX (US)

(72) Inventor: Monty L. Ruetenik, Clear Lake City, TX (US)

(73) Assignee: Monty L. Ruetenik, Clear Lake Shores, TX (US)

( * ) Notice: Subject to any disclaimer, the term of this patent is extended or adjusted under 35 U.S.C. 154(b) by 205 days.

(21) Appl. No.: 18/296,041

(22) Filed: Apr. 5, 2023

(65) Prior Publication Data

US 2023/0309535 A1 Oct. 5, 2023

Related U.S. Application Data

(63) Continuation-in-part of application No. 18/094,216, filed on Jan. 6, 2023.

(60) Provisional application No. 63/327,319, filed on Apr. 4, 2022.

(51) Int. Cl.
*A01L 3/02* (2006.01)

(52) U.S. Cl.
CPC ...................... *A01L 3/02* (2013.01)

(58) Field of Classification Search
CPC ......................................................... A01L 3/02
See application file for complete search history.

(56) References Cited

U.S. PATENT DOCUMENTS

| | | | | |
|---|---|---|---|---|
| 3,705,932 A | * | 12/1972 | Hurst | B29C 66/81423 425/388 |
| 3,947,196 A | * | 3/1976 | Tribbett | B29C 45/67 425/573 |
| D728,867 S | | 5/2015 | Ruetenik | |
| D746,519 S | | 12/2015 | Ruetenik | |
| 9,770,018 B2 | | 9/2017 | Ruetenik | |
| D838,059 S | | 1/2019 | Ruetenik | |
| 10,206,386 B2 | | 2/2019 | Ruetenik | |
| 10,292,872 B2 | | 5/2019 | Ruetenik | |
| 10,375,946 B2 | | 8/2019 | Ruetenik | |
| 10,548,304 B2 | | 2/2020 | Ruetenik | |
| D897,052 S | | 9/2020 | Ruetenik | |
| D913,605 S | | 3/2021 | Ruetenik | |
| D940,967 S | | 1/2022 | Ruetenik | |
| D968,035 S | | 10/2022 | Ruetenik | |
| 2008/0181977 A1 | * | 7/2008 | Sperry | B29C 64/106 425/90 |
| 2014/0325944 A1 | | 11/2014 | Ruetenik | |
| 2017/0027150 A1 | | 2/2017 | Ruetenik | |

(Continued)

FOREIGN PATENT DOCUMENTS

DE 102014001508 A1 * 4/2015 .............. A01L 11/00

OTHER PUBLICATIONS

Translation of Gruber accessed on ESpacenet Jul. 15, 2025 (Year: 2015).*

*Primary Examiner* — JaMel M Nelson
*Assistant Examiner* — Erica Hartsell Funk
(74) *Attorney, Agent, or Firm* — Boulware & Valoir PLLC

(57) ABSTRACT

An equine shoe structure and assembly that provides a cushioning effect on the equine hoof and legs, covers substantially all the underside of a hoof, and provides an upper concave surface shaped to mate with a rounded shaped equine hoof. An apparatus to convert a flat topped shoe to concave is also provided along with methods of use for the apparatus and shoe.

11 Claims, 8 Drawing Sheets

(56) References Cited

U.S. PATENT DOCUMENTS

2019/0069514 A1 3/2019 Ruetenik
2021/0400942 A1 12/2021 Ruetenik

* cited by examiner

EQUINE SHOE WITH CONCAVE TOPSIDE

PRIOR RELATED APPLICATIONS

This application is a continuation-in-part of Ser. No. 18/094,216, filed Jan. 6, 2023, which claims priority to U.S. Ser. No. 63/327,319, filed Apr. 4, 2022, incorporated by reference in its entirety for all purposes.

FEDERALLY SPONSORED RESEARCH STATEMENT

Not applicable.

FIELD OF THE DISCLOSURE

The disclosure generally relates to equine shoes. More specifically, it relates to an equine shoe structure and assembly that provides a cushioning effect on the hoof and legs, covers substantially all the underside of a hoof, provides an upper concave surface shaped to mate with a rounded shaped equine hoof.

BACKGROUND OF THE DISCLOSURE

The horse's hoof is a miracle of bioengineering—containing a host of structures which, when healthy, operate in equilibrium with each other to form a hoof capsule that is able to withstand huge forces, utilizing energy to assist with forward movement while providing protection to the sensitive structures beneath. FIG. 1A-C provides somewhat simplified line drawings of the structures therein, which are briefly discussed herein to orient the reader to the equine hoof.

Sole The sole is the area inside the white line, but not including the bars and frog. It's primary function is to protect the sensitive structures beneath the sole. However, the outer perimeter of sole around the toe also provides support, sharing some of the weight of the horse with the hoof wall.

White Line Commonly referred to as the white line, although this misleading, not only because it is actually yellowish but also because it is next to the white inner wall of the hoof. This often causes people to misinterpret the white line as inner wall, so it is sometimes called the Golden Line—a more accurate description that was commonly used in the 1800s. The purpose of the Golden Line is to join the sole to the inner wall of the hoof and to seal off the border of the pedal bone to protect it from bacteria. It creates a shallow crease at the bottom of the hoof that fills with dirt, aiding with traction.

Inner Wall The inner hoof wall is usually white. It is more pliable than the outer wall due to it's higher moisture content, which enables the inner wall to stretch more as the outer wall moves, ensuring the inner workings of the hoof are protected from too much shock as well as allowing the pedal bone and the outer wall to move in different ways without losing strength of attachment.

Outer Wall The outer hoof wall is pigmented and is much stronger than the inner wall. Its purpose is to bear the weight of the horse, protect the internal structures from harm and to act like a spring, storing and releasing energy during the different phases of the stride to help propel the horse along. A healthy outer wall will be slightly thicker at the toe and have no growth rings or cracks. It will be almost impermeable when healthy and uninjured.

Bar The bar is an extension of the hoof wall that runs along the side of the frog, terminating approximately halfway along the frog. Its primary purpose is to control the movement of the back of the hoof, adding strength to the heel area and protecting it from excess distortion. It should have a high ratio of pliable inner wall to ensure it can move correctly as the heel moves. More recent research has found that the bar also produces some of the material that makes up the sole.

Angle of the Bar Commonly known as the heel, although this description can be misleading. This area is designed to receive the initial impact of the horse's stride and a healthy angle of the bar comprises mainly of pliable inner wall, enabling it to dissipate excess shock with ease. This area plays a major role in supporting the weight of the horse and it is important that it remain correctly balanced.

Collateral Groove This is the groove that runs along either side of the frog. The outer wall of the groove is made up of the wall of the bar and sole and the wall on the other side comprises the wall of the frog.

Frog One of the most important, but oft neglected structures of the hoof. It should be wide and substantial and made up of thick, cartilaginous material. The frog works in concert with the coronet band, the bars and the sole to provide resistance to distortion of the hoof capsule during the stride. Pressure placed upon the frog directly influences the health of the digital cushion above it. The frog stay (triangular piece cut out of the sole that the frog sits in) allows independent movement at the heels as the horse lands on uneven ground. The frog also plays a part in protecting the sensitive structures beneath, providing traction, assisting circulation and absorbing shock. It also contains many nerves which enable the horse to feel what it is standing on and be aware of where its feet are in relation to the rest of its body (proprioception).

In the center of the frog, towards the back of the foot is the central sulcus. A healthy sulcus is wide and shallow, but if the frog is weak and narrow it can become a deep crease that is a haven for bacteria and fungus.

Coronary Band The coronary band is a very tough, vascular structure that sits at the top of the hoof wall. It has two very important functions. Firstly it produces the tubules of the outer hoof wall. Secondly, it is incredibly strong and acts as a band of support to add strength to the internal structures as the hoof distorts during the stride.

Periople This is a protective covering for the area of newly formed hoof wall just below the coronet band. In the early stages, this horn material is quite soft—deliberately so because it helps to prevent the coronary band becoming bruised as shock is transferred upwards through the hoof wall during the weight bearing phase of the stride. The periople covers this horn to provide protection.

Coffin Bone The large bone inside the hoof capsule is known as the pedal bone or coffin bone. Its shape provides a framework for the shape of the hoof capsule, provides strength and stability to the hoof and acts as a framework to hold other structures in place. It does not have a medulla (bone marrow) and has an unusually high density of tiny blood vessels running through it. Surrounding the wall of the bone is the laminae which hold the wall to the bone and produce some of the intertubular horn of the hoof wall. Underneath, the bone is covered in solar corium which produces the sole. At the back, the bone attaches to cartilage which forms a large portion of the back of the hoof. Tendons and ligaments are attached to this bone and a dense network of blood vessels run around and through it.

The leading edge of the coffin bone should be parallel to the hoof wall, and its lower surface almost parallel to the sole as shown in FIG. 1C.

Navicular Bone The navicular bone, also known as the distal desamoid bone, sits just inside the back of the coffin bone and the deep digital flexor tendon passes over it. It prevents over-articulation of the joint of the coffin bone, maintains a constant angle of insertion of the deep flexor tendon into the back of the coffin bone and allows for additional tilt within the coffin joint when navigating uneven surfaces.

Short Pastern Bone Also known as the Middle Phalanx, the short pastern bone sits on top of the articulating joint of the pedal bone and underneath the long pastern bone. Only the bottom portion of this bone extends as far as the hoof capsule.

Digital Cushion The digital cushion sits just behind the pedal bone and above the sensitive frog. It plays a vital role in the absorption of shock. In an improperly functioning foot, the digital cushion atrophies and becomes "fatty" as opposed to springy, cartilaginous material, inhibiting its ability to absorb shock. The shape and health of the digital cushion will influence the angle of the coffin bone. "Flat footed" horses (i.e., those whose coffin bones lie flat instead of being tilted slightly on their nose) often have severely atrophied digital cushions.

Coriums A corium is a vascular structure that manufactures hoof horn. For instance, the solar corium will produce the sole and the frog corium produces the frog. The coronary band contains a corium which produces the tubules and intertubular horn of the hoof wall, whereas more intertubular horn is manufactured in the corium surrounding the coffin bone (also known as the dermal layer or laminae). The perioplic corium sits under the coronary band and produces the periople.

Lateral/Ungual Cartilage The lateral cartilages are located both above and below the coronet band, extending around the front, the sides and back of the hoof. Below the coronary band they extend out over the digital cushion and attach to the back of the coffin bone. The horn producing corium of the inner hoof wall attaches to the lateral cartilages at the back of the hoof where the coffin bone does not reach. These cartilages provide resistance as the coffin bone descends during weight bearing, regulating the amount of pressure applied to the coriums. They also help to suspend the coffin bone in the correct position as well as acting as a spring, storing and releasing energy during locomotion.

Blood supply Finally, the hoof is heavily supplied with blood through the two arteries which run down the back of the leg and into the foot. The coffin bone itself has an unusually high density of blood vessels within it. The blood pumping around the foot has many vital uses. It supplies nutrients to allow growth of new horn tissue, assists with damping impact shock and helps to regulate hoof temperature.

Equines with laminitis or other diseases or abnormalities of the hoof require special hoof treatment. When an horse suffers laminitis, the lamina of the hoof is weakened and the position of the coffin bone seems to shift from its normal position parallel to the ground to an angled position that is more toe down. In fact, it is believed that the coffin bone does not actually shift but that the hoof shifts due to the weakened lamina. The shift of the position of the coffin bone is very damaging, can penetrate the sole and even be fatal.

Generally, correction of the shift may be accomplished by proper trimming of the hoof and/or special rocker shoes or boots (or attachments thereto) that reposition the hoof and coffin bone, mitigating the pressures caused by the shift. Trimming the hoof to have a rounded bottom (as by rounding the toe and heel) is especially effective in repositioning the coffin bone/hoof positions and can provide positive results. However, there are many instances where an equine still needs protection from the ground, dirt, and impacts, and thus would benefit from the added protection of a shoe. Regular horse shoes, however, have a flat upper surface and will not fit a hoof that is trimmed in this fashion.

Thus, what is needed in the art is an equine shoe having an upper concave surface to correctly mate against the rounded shape of a trimmed equine hoof. The present invention provides such a shaped shoe, as well as a method of constructing such a shoe.

SUMMARY OF INVENTION

This invention is an equine, dual density, polymeric horse shoe that generally covers the entire underside of a hoof. The shoe is sloped on the underside (generally convex) to allow the hoof to roll forward or to the side without unnecessary bending, thus allowing an equine to find a comfortable natural position to relieve stress on a sore, injured or diseased hoof. In addition, there is an upper surface that is concave to perfectly fit adjacent the rocker-trimmed hoof.

Ideally, the shoe has a dual density polymer construction (having a top and a bottom components of differing densities) with a relatively narrow or thin, hard section on the top section and a thicker, softer, more flexible section below. The harder upper component attaches to the hoof and acts to stabilize the softer lower section.

The rocker trimmed hoof is typically determined by observing a radiograph image of the hoof, and then expertly trimming the hoof to round the bottom and reposition the coffin bone to its natural position, almost parallel to the ground. Rounding the underside of the hoof, and attaching an equine shoe with a concave top surface that mates with the round shape of the hoof allows precise location of the coffin bone to achieve both comfort and healing relief for a laminitic equine hoof, yet provide the protection of a shoe. The hoof (and attached shoe) is typically rounded front to back, but also be slightly rounded side to side. There are significant advantages when a hoof is so rounded and combined with a rocker bottom shoe.

However, every foot will have a different shape, and thus for a efficacy and comfort it is necessary to provide a perfect fit against the hoof. Thus, the invention also includes a device to shape the topside of a polymeric equine shoe. Since the shoe is polymeric, it can be heated or warmed and bent to the desired shape. This allows the shoe to perfectly mate with the rocker trimmed hoof, ensure that the pressure is correctly distributed, and not concentrated in anyone or more spots.

The invention includes any one or more of the following embodiments, in any combination(s) thereof:

An equine polymer shoe having a top section and a bottom section wherein the top section has a concave shape formed into it that is designed to mate with a rounded bottom side of an equine hoof.

An equine rocker shoe, said rocker shoe having a top polymeric layer of a harder durometer than a bottom polymeric layer, said top polymeric layer being concave and shaped to fit adjacent a rocker trimmed hoof, said bottom polymeric layer being convex to provide a rocker shape.

Any equine shoe herein described, converted into a boot by attaching a fabric upper to said shoe, said upper shaped to fit over a hoof and close at a coronary band.

Any equine shoe or boot herein described, where the polymer is polyurethane.

Any equine shoe or boot herein described, where the bottom section is convex, providing a rocker shape.

Any equine shoe or boot herein described, said top polymeric layer being Shore A 85-95 and said bottom polymeric layer being Shore A 40-70 or wherein said top polymeric layer being Shore A 89-95 and said bottom polymeric layer being Shore A 45-65.

Any equine shoe or boot herein described, said bottom polymeric layer having treads on a bottoms surface thereof.

A device having a base with a recessed section shaped to receive a heated equine shoe and a lever with a plunger constructed so that the plunger may be used to press a section of the topside of a heated polymeric equine shoe located in the recessed section to a desired depth and shape.

An apparatus for shaping a polymeric equine shoe, said apparatus having: a base; a platform attached to said base, said platform having an equine shoe shaped depression therein; a lever arm operably affixed to said base and configured to depress a plunger ending in a stop when activated, said plunger and stop positioned above and inside said depression when said lever arm is in a resting position, and said stop reaching a surface of said depression when said lever arm is activated.

An apparatus for shaping a polymeric equine shoe, said apparatus having: a platform having an equine shoe shaped depression therein; a lever arm operably affixed to said base and configured to depress a plunger ending in a stop when activated, said plunger and stop positioned above and inside said depression when said lever arm is in a resting position, and said stop reaching a surface of said depression when said lever arm is activated.

Any device or apparatus herein described, wherein said device is configured such that said stop position is adjustable.

Any device or apparatus herein described, wherein said plunger is configured to be shifted back and forth along the lever arm, or the lever arm itself can be shifted back and forth with respect to its attachment point, thereby adjusting a position of said plunger and said stop.

Any device or apparatus herein described, wherein said plunger is positioned in a slot in said lever arm and can be shifted back and forth along said lever arm, thereby adjusting a position of said plunger and said stop.

Any device or apparatus herein described, wherein said stop comprises rubber or polyurethane.

Any device or apparatus herein described, wherein said platform is reversibly attached to a base, and said apparatus includes a plurality of platforms, each platform having a different sized equine shoe depression.

Any device or apparatus herein described, wherein said stop is reversibly attached to said plunger, and said apparatus includes a plurality of stops, each stop having a different size and/or shape.

Any device or apparatus herein described, wherein said lever arm is operably connected to a motor, and activating said motor activates said lever arm.

A method of shaping the topside of an polymeric equine shoe having a topside and a bottom side, said method comprising: a) heating said equine shoe to a malleable point, without melting said equine shoe; b) pressing an area of the topside of said equine shoe to form a shaped equine shoe that has a concave top surface; and c) rapidly cooling shaped equine shoe to fix its shape. The method can also including step b2), wherein said shoe is compared to rocker trimmed hoof and said concave-shaped shoe is adjusted if needed for better fit against said rocker trimmed hoof. In addition, steps a), b) and b2) can be repeated as needed.

A method of treating laminitis, said method comprising: a) rocker trimming an equine hoof; b) fitting any shoe or boot herein described to said rocker trimmed hoof.

DETAILED DESCRIPTION OF THE INVENTION

Figure 1A:
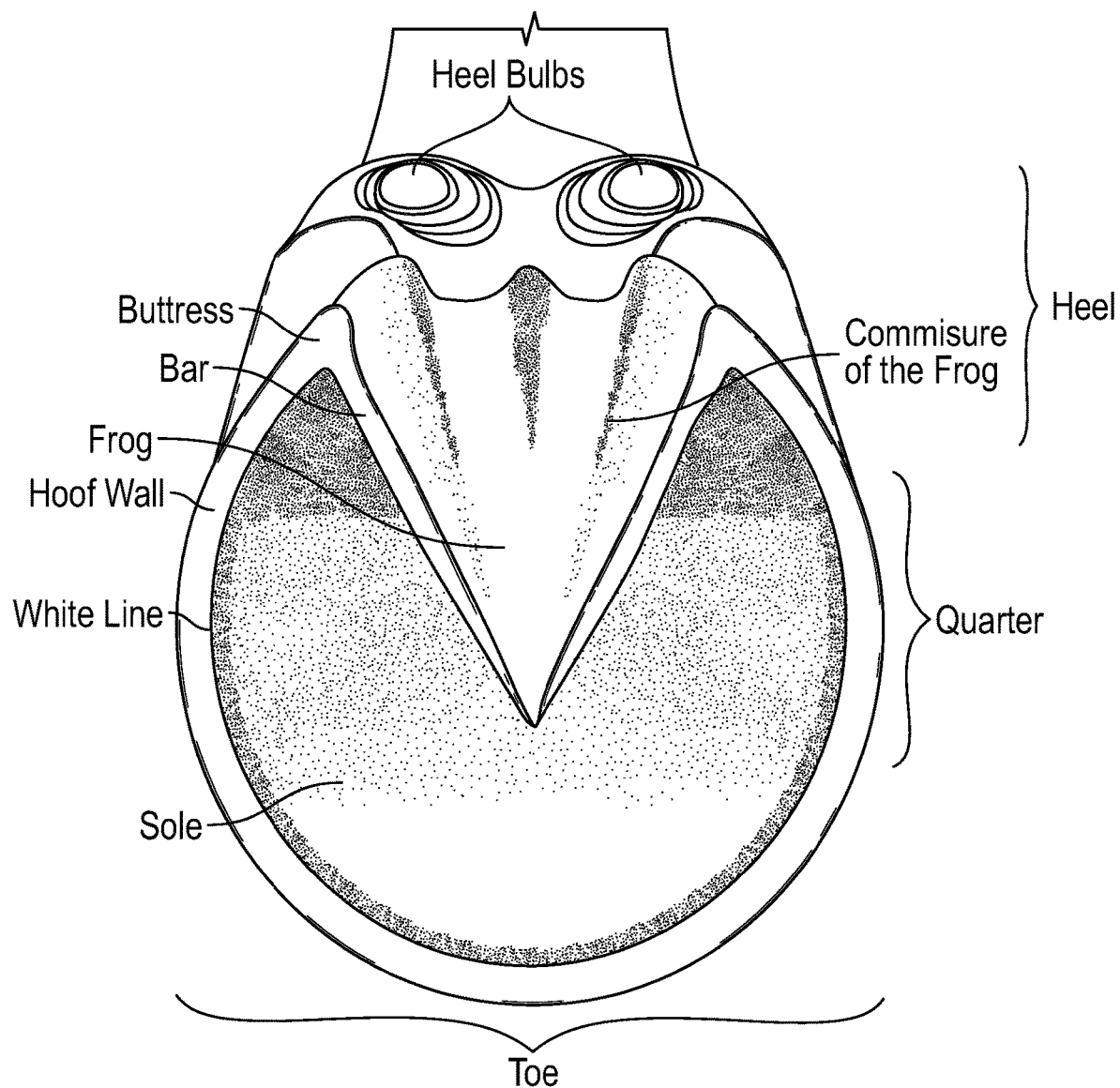
FIG. 1A (prior art) is a drawing of the hoof structure as seen from the bottom.
Figure 1B:
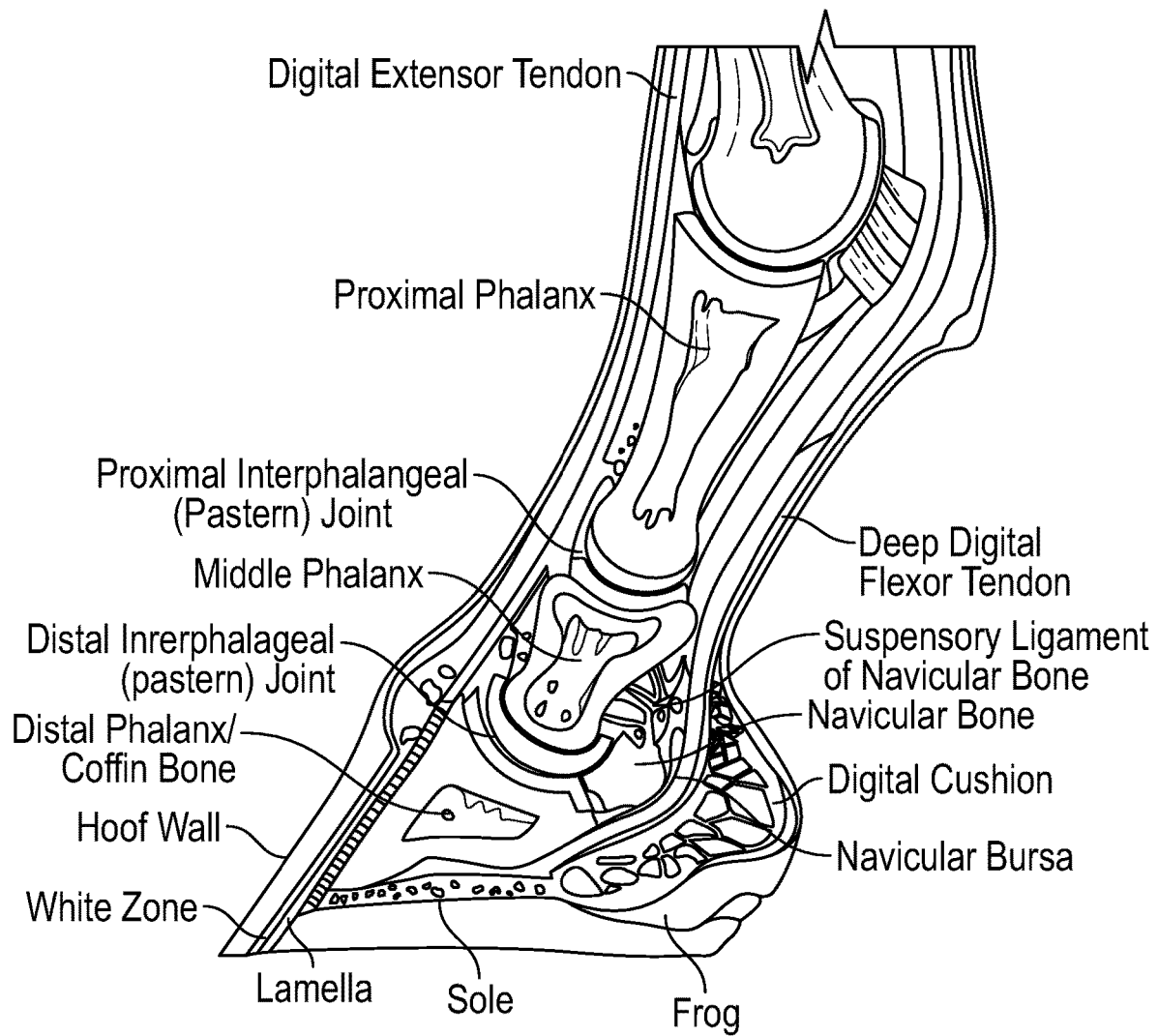
FIG. 1B shows the structures in side view and FIG. 1C shows the correct alignment of the coffin bone in a healthy hoof structure.
Figure 1C:
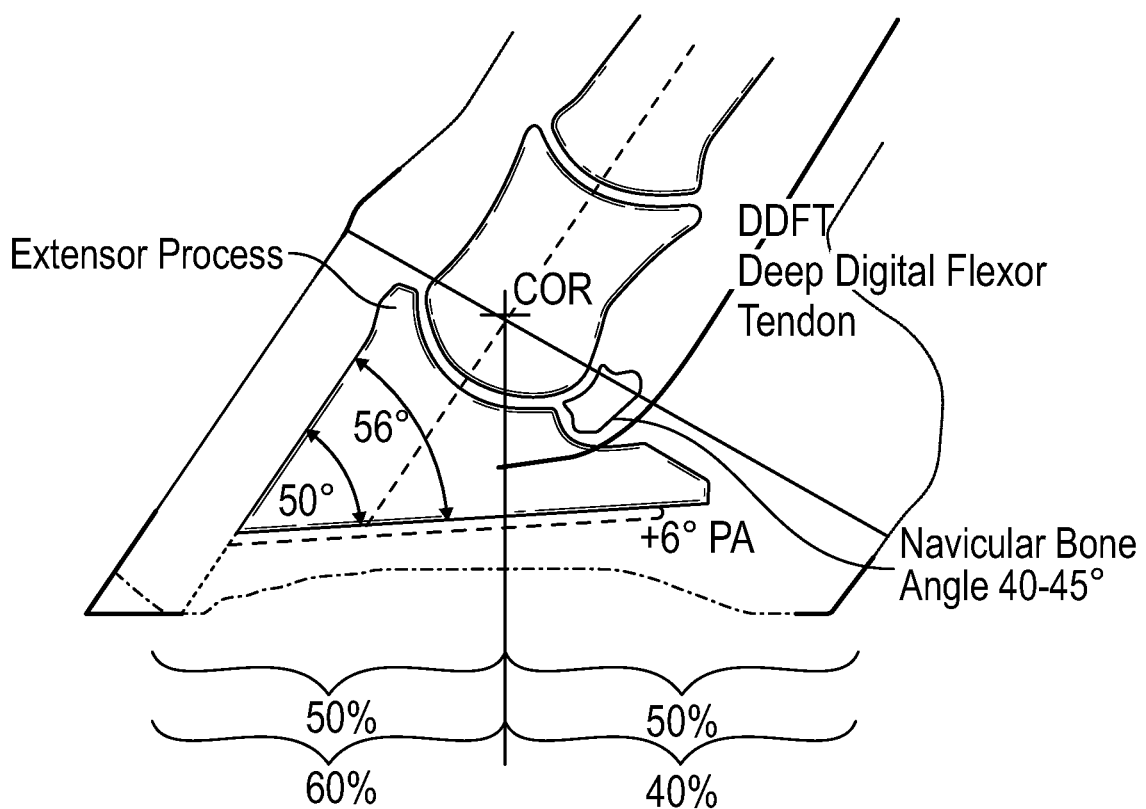

Generally speaking the shoes of the invention are rocker shoes designed to fit on the rocker trimmed hoof—thus the bottom is rocker shaped, and the top is the negative image or the reverse of a rocker shape.

As used herein, "rocker" refers to a shape that is somewhat convex around the edges, allowing easier breakover of the shoe/hoof as the equine moves. The edges are typically rounded to be convex front to back, but can also have slight rounding side to side. A rounded toe is also sometimes referred to as a "mustang roll," as wild horses self-trim in a mountainous environment to significantly round the front of the hoof.

The rocker shoes of this invention are composed of (at least) two components—an upper layer and a lower layer. The two portions are of different densities or hardness, the upper layer being in a hardness similar to a typical hoof wall, and the lower layer being less hard and thus able to flex to absorb impact and thus cushion the foot. The upper layer should be concave, so as to mate well with a rocker trimmed hoof, and the lower layer is convex, the same as any rocker trimmed hoof or rocker shoe or boot.

In use the shoe is typically glue to the sole, using adhesives known in the art, but this is not essential, and the shoe may also be nailed on or otherwise attached.

The top layer is polymeric, and may be of any suitable moldable material of sufficient hardness. The upper layer has at least Shore A 85-95, and preferably is 90-95. Polyurethane is preferred, as it is moldable, easily shaped with common farrier tools, such as rasps and knives, but other thermoplastic polymer materials can be used, such as polyvinyl chlorides or styrene butadiene styrene polymer are also usable.

Other polymers that can be used include polyethylene (PE), polypropylene (PP), polyacrylic acids (PAA), polyacrylic esters (PAc), poly(methyl methacrylate) (PMMA), acrylonitrile butadiene styrene (ABS), polyamides, polybenzimidazole (PBI), polycarbonate (PC), polyether sulfone (PES), polysulfone, polyether ether ketone (PEEK), polyetherimide (PEI), polyphenylene oxide (PPO), polyphenylene sulfide (PPS), polyvinylidene fluoride (PVDF), polytetrafluoroethylene (PTFE), and the like.

The hard upper layer is about one-sixteenth (1/16) to one-half (1/2) inch thick and should not be so hard as to be brittle and break in use, but very rigid compared to the remainder of the shoe. In embodiments that are glued to the hoof, it is preferred that the top section have a hardness similar to the hardness of the equine outside hoof wall, because similar hardness materials are more easily bonded by adhesive.

Copper, silver, or other solid medical components may be incorporated into the top side or coated onto the hoof-contacting topside, providing biocidal or other medical functionality when in use, but this is optional.

The lowermost layer has a Shore A hardness of about 45-70, with 45-65 preferred and about 60 being ideal. It too is polymeric, may be of any suitable moldable material, such as is described for the upper layer. It is thicker than the upper layer, being at least 1/4 inches to as much as 1 inch, and is preferably about 0.5 inch. Or course, since the lower surface is rockered, the thickness will vary, as it will be thinner at the edges and even more so at the toe.

In the currently available commercial embodiments, the lower layer is not as large as the upper layer, the size reduction contributing further to the rocker surface, as well as providing a hard edge for nails. The lower layer can be similar in shape to the shoes described in U.S. Ser. No. 10/548,304, and the manufacture and materials are very similar too (although the upper layer herein is convex). Shoes such as those described in FIG. 1A, through 3A of U.S. Ser. No. 10/548,304 are especially useful, as are the shoes described in USD897052.

In some embodiments, there can also be a middle layer, but this is optional.

The position of the coffin bone is determined by x-ray to determine an optimum position of the coffin bone. Rounding the underside of the hoof, and attaching a polymer shoe with a concave upper side (positioned next to the underside of the rounded hoof) facilitates achieving a precise location of the coffin bone to provide both comfortable and healing relief for a laminitic equine hoof. Ideally, a second radiograph will confirm that the desired position has been achieved, and once confirmed, the shoe may be attached to the hoof.

In practice, the shoe may be shaped first and then the hoof, or the reverse, depending on whether this is a first shoeing or not. A contact paper that will transfer color (such as is employed by dentists) or any color applied to the hoof (or the shoe) may used to determine if there are any spots that fail to contact or spots that are too high. The hoof or the shoe can be further rasped, or otherwise adjusted as needed for the perfect fit.

Figure 2:
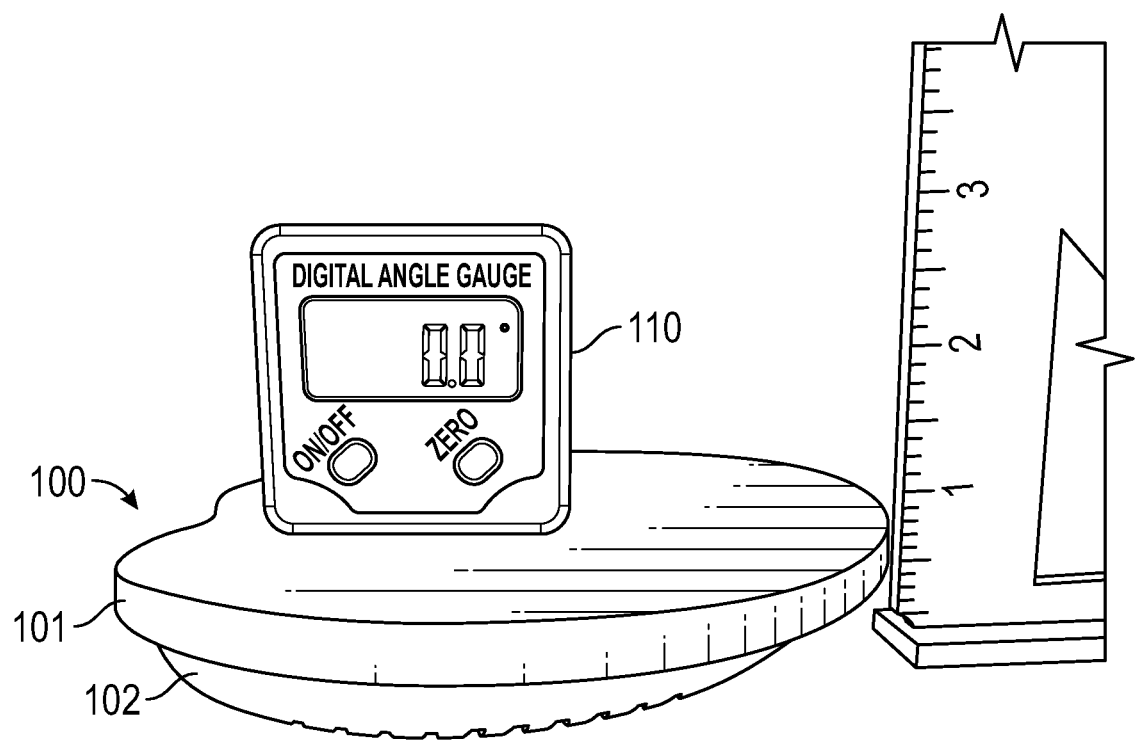
FIG. 2 (prior art) is a front view of a polymer shoe with a flat normal upper side with an angle monitor. If the prior art shoes are made of resin, they can be modified as described herein to have a concave upper surface.

Referring to the drawings and pictures, FIG. 2 is a picture of a polymer shoe of an with a normal generally flat top side 101, and convex bottom side 102. In practice, the top may not be completely flat as it may accommodate the slightly concave shape of the equine sole, however with respect to the outer circumference of the hoof, it is flat, and the current commercial available rocker shoes are completely flat.

Since the top is flat, this shoe could not be used with a rocker-trimmed hoof, as the rocker trimmed hoof sole will not mate correctly with a flat surface. However, as taught herein a resin shoe can be heated and shaped to form a concave top, convex bottom rocker shoe as herein described and as shown in FIGS. 3 and 4.

Figure 3:
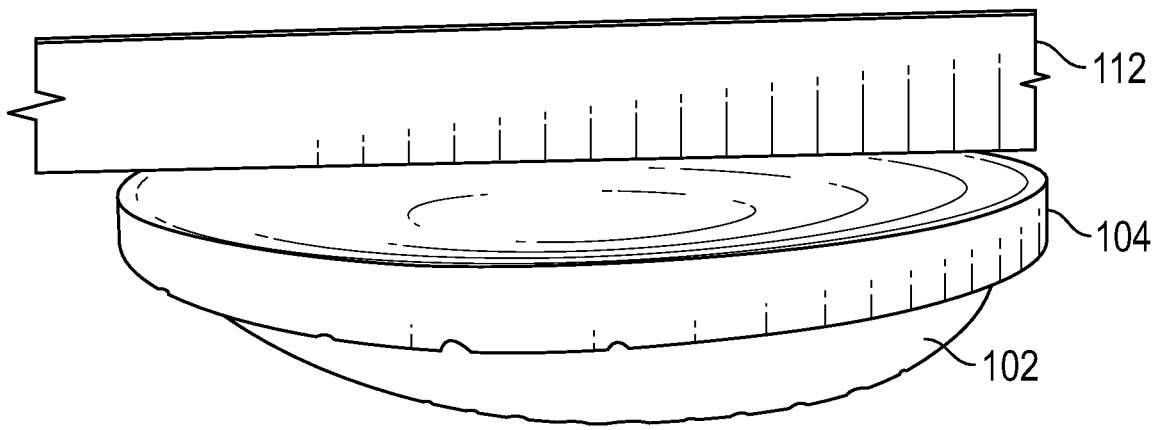
FIG. 3 is a side view of a polymer shoe of one embodiment of the invention with a concave upper side.
Figure 4:
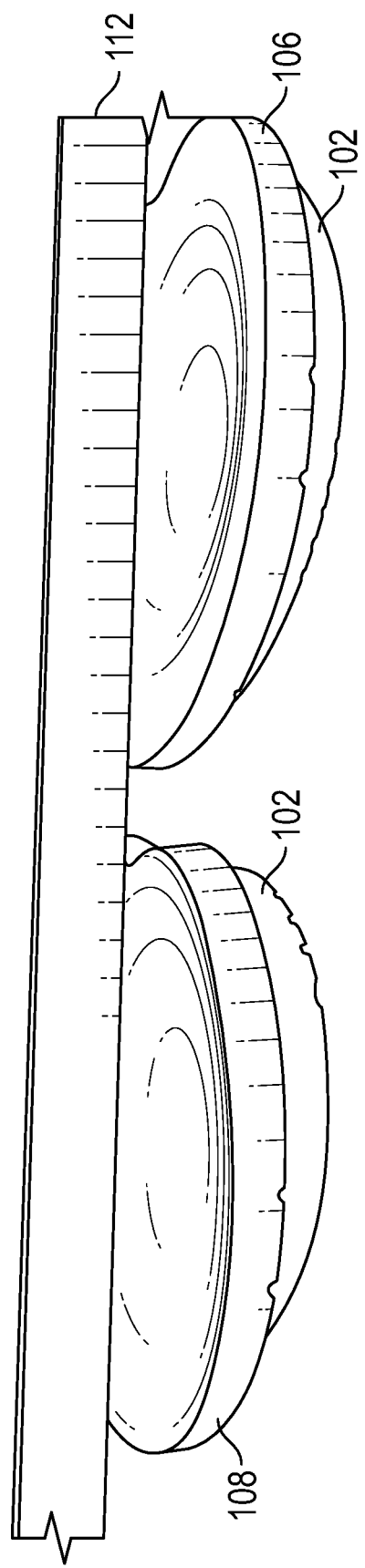
FIG. 4 is another side view of a polymer shoe of another embodiment of the invention with a deep concave upper side (left) and a shallower concave upper side (right).

FIGS. 3 and 4 are shoes showing a concave topside of varying depth at 104, 106, 108 and the same bottom side 102. 112 is just a flat edge for comparison. In FIG. 4, we see more clearly that the depth of the concave may be varied, having greater curvature in the embodiment on the left than on the right. Thus, the concave depth as well as its shape and location are flexible and the shoe may be shaped as desired.

In order to convert an existing polymeric rocker shoe to fit a rocker trimmed horse, the polymer is heated for reshaping. For example, for polyurethane shoes of a composition as described in U.S. Ser. No. 10/548,304 and available at SoftRideBoots.com, the shoe is heated to about 300° F. to soften the hard polymer top section of the shoe.

Figure 5:
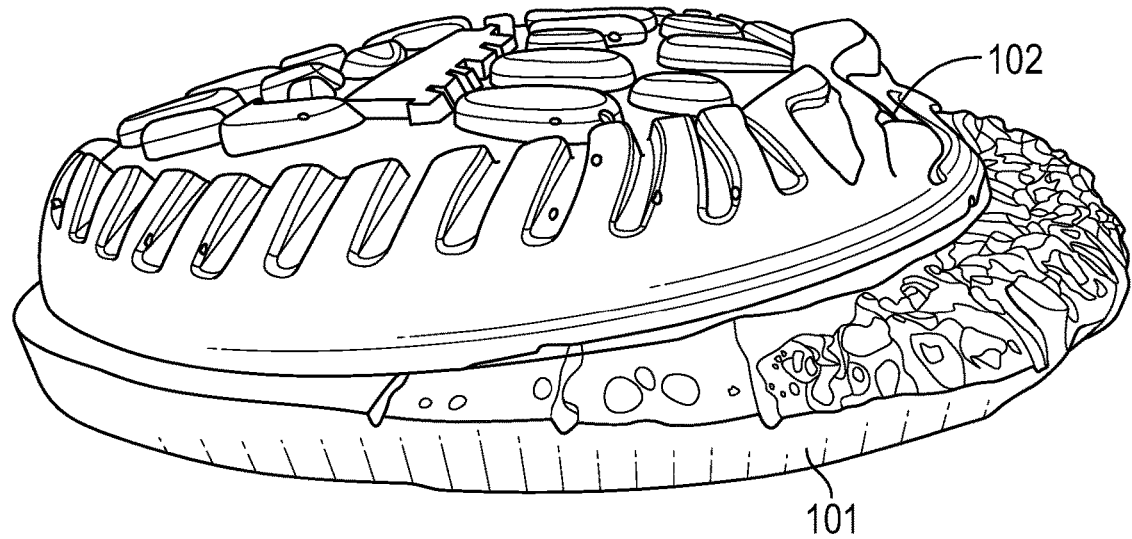
FIG. 5 is side view of a polymer shoe of an embodiment of the invention that has been overheated.

The shoe should not be heated to far as to cause melting, bubbling or slumping of the shape. FIG. 5 shows the result of overheating the shoe—in this case to 350° F.—and warping of the bottom layer 102 and bot warping and bubbling of the top layer 101 is seen. Thus, care should be taken to stay within the thermal limits of the polymers used.

The polyurethane shoe is correctly heated to about 300° F. to soften the hard polymer top section. This can be done with a hot oil bath or heat gun, but is preferably done with a temperature controlled small portable oven. The center section of the topside can then be pressed downward to form the desired concave shape. The shoe is then quickly cooled to set the shape, as by submerging it in a water bath (preferably a cooled water bath). The degree of heating of other polymer composition necessary to soften the topside for shaping can be easily determined by those skilled in the art, by prior knowledge or by trial and error.

Figure 6:
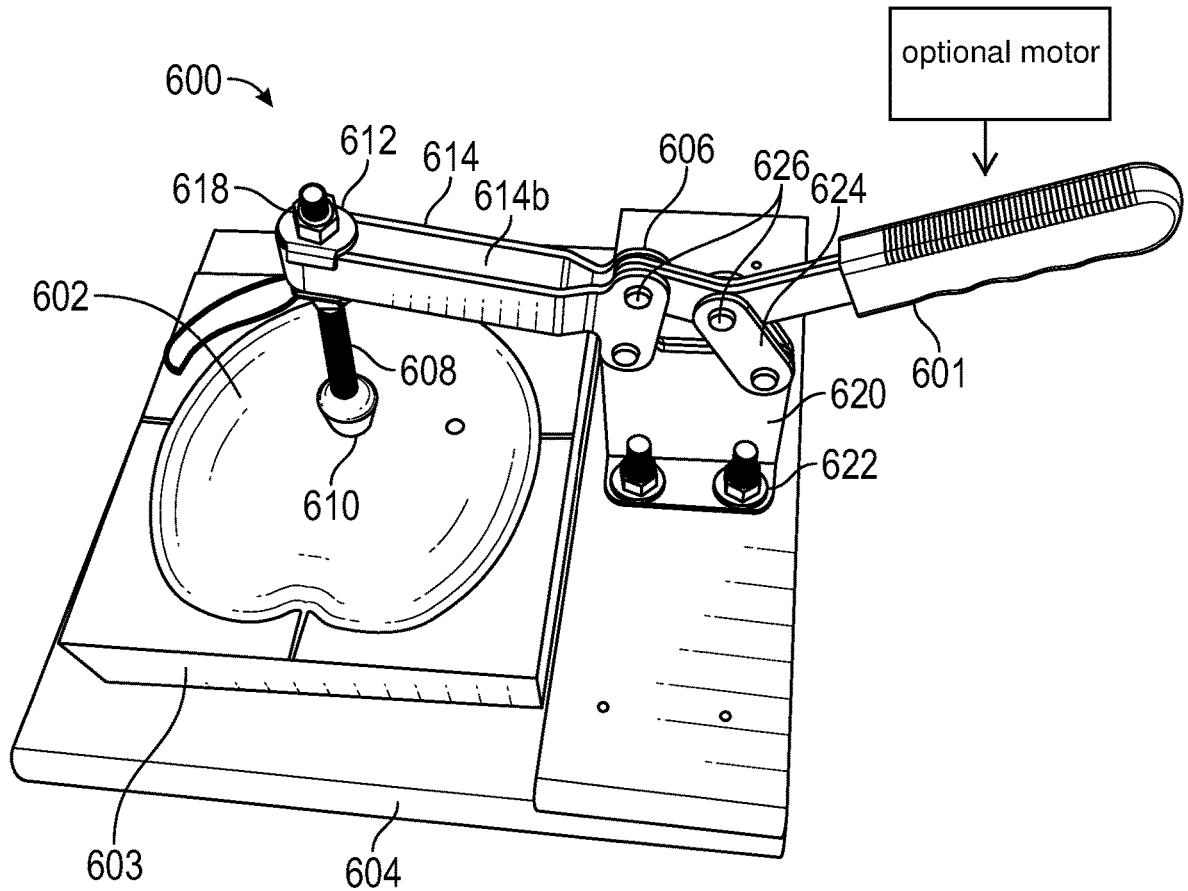
FIG. 6 is a top perspective view of a device to produce a concave top side in a polymer shoe of an embodiment of the invention.

FIG. 6 illustrates a device 600 that is useful for forming the desired concave shape in the topside of a polymeric shoe. The device consists of a base 604 with an optional platform 603 having a recessed area 602 of a shape to receive a polymer shoe—thus there will be a rocker-shaped concave depression to receive the rocker shoe. Where the platform is omitted, the depression 602 will be in the base 604, but an interchangeable platform 603 is preferred.

Preferably, a plurality of platforms 603 are provided, each with a depression 602 in a range of shoe sizes, since the variety of shoes sizes available is quite large and a single depression size will not suffice for both a pony and a horse. The platforms 603 can then be easily switched out as needed for different shoe sizes. The platforms 603 can be attached with any suitable means, such as bolts or clips, or preferably just fitted into a rectangular or other shaped depression provided for a platform 603 with the same shape.

There is an adjustable levered arm 601 with a section 614 containing a slidable plunger 608 ending in a stop 610, so that when the lever is activated, the plunger and stop press down on the topside of the heated shoe (not shown) that is positioned in the recessed area 602.

Section 614 is formed with two parallel bars that provide a slot 614*b* that allows plunger 608 to slide along section 614, such that the plunger 608 and stop 610 can be positioned in any desired part of the topside of the shoe by loosening nut 618 and can be fixed in place at the desired location. In such manner, depression can be made anywhere along the shoe and the negative-rocker shape made in the heated polymeric shoe. However, there are other mechanical means of adjusting the position of plunger 608 that could be used and provide the same functionality.

The device of FIG. 6 is a prototype, and so is somewhat simplistic, being assembled of readily available parts. Thus, plunger 608 is merely a threaded bar, and stop 610 a rubber foot, such as might be used on the bottom of a chair, merely screwed thereonto.

In the prototype, handle 601 connects with section 614 using pivoting plates or hinges 624 and rivets or pins 626 fitted through holes (not visible), such that lifting handle 601 will depress plunger 608. These parts are mounted on a vertical section 620 via bolts 622. However, these mechanical connections can easily be modified and any number of connections provide the same functionality.

In operation, a flat topped rocker shoe is heated to a desire temperature, placed in the recessed area of the device and the plunger activated to push the desired shape into the topside of the shoe. The shoe shape can be compared to the hoof shape by placing it thereon with color transfer paper and wiggled a bit. It may be useful to cool the shoe somewhat before fitting so as to not overheat the hoof. If there are high parts, they will be colored, and the farrier can reduce that section and test again. If this process takes too much time, it may be necessary to rewarm the shoe, but a nearby oven makes this quick and easy. Once the fit is sufficiently perfect, the entire device with the shoe or just the shoe alone is submerged in a cold water bath to quickly cool the shaped shoe and thus fix the concave shape in the topside of the shoe.

Figure 7:
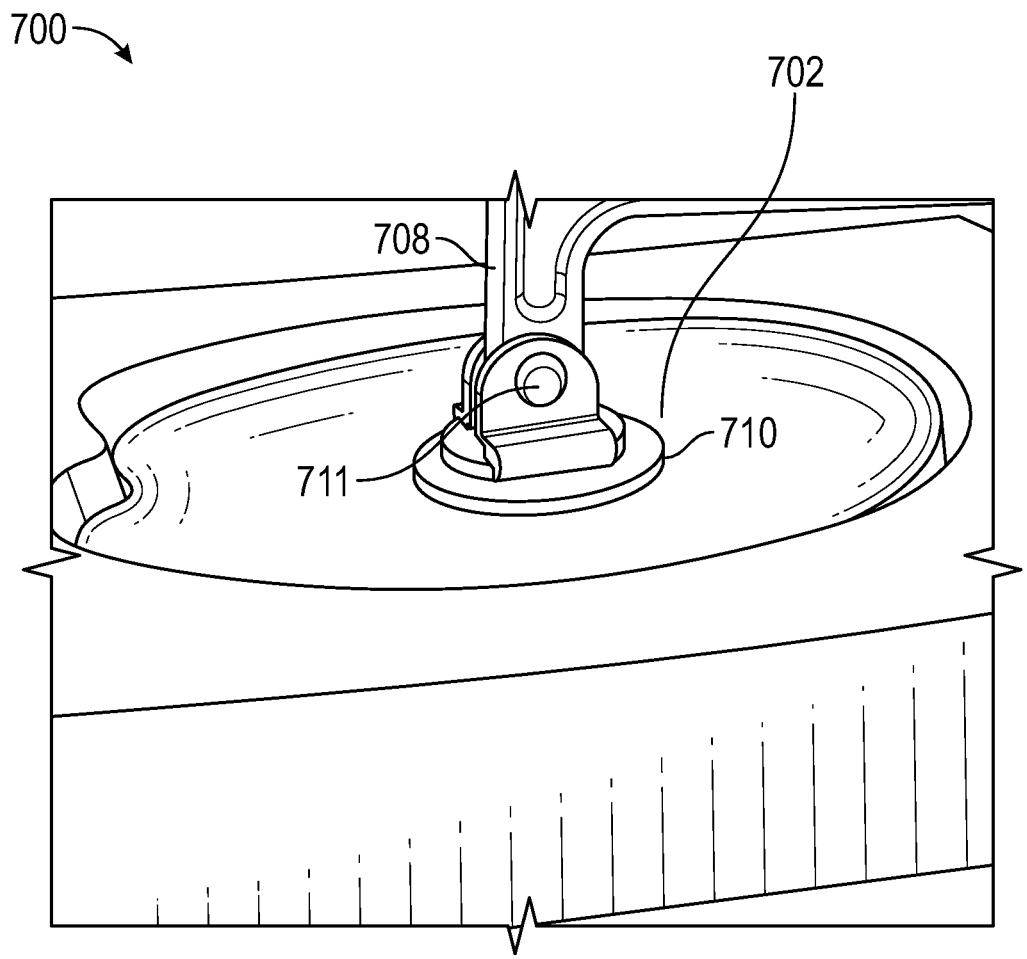
FIG. 7 is a closeup view of a different embodiment of the device to produce a concave top side in a polymer shoe. This device has a larger stop that the device of FIG. 6, and the stop attachment means also differs.

In yet another embodiment, the stop 710 is larger as seen in FIG. 7. This stop has a more robust attachment means including throughpin or rivet 711, that passes through a hole (not visible) in the plunger 708. However, this is exemplary and the attachment means can be any known in the art.

Figure 8:
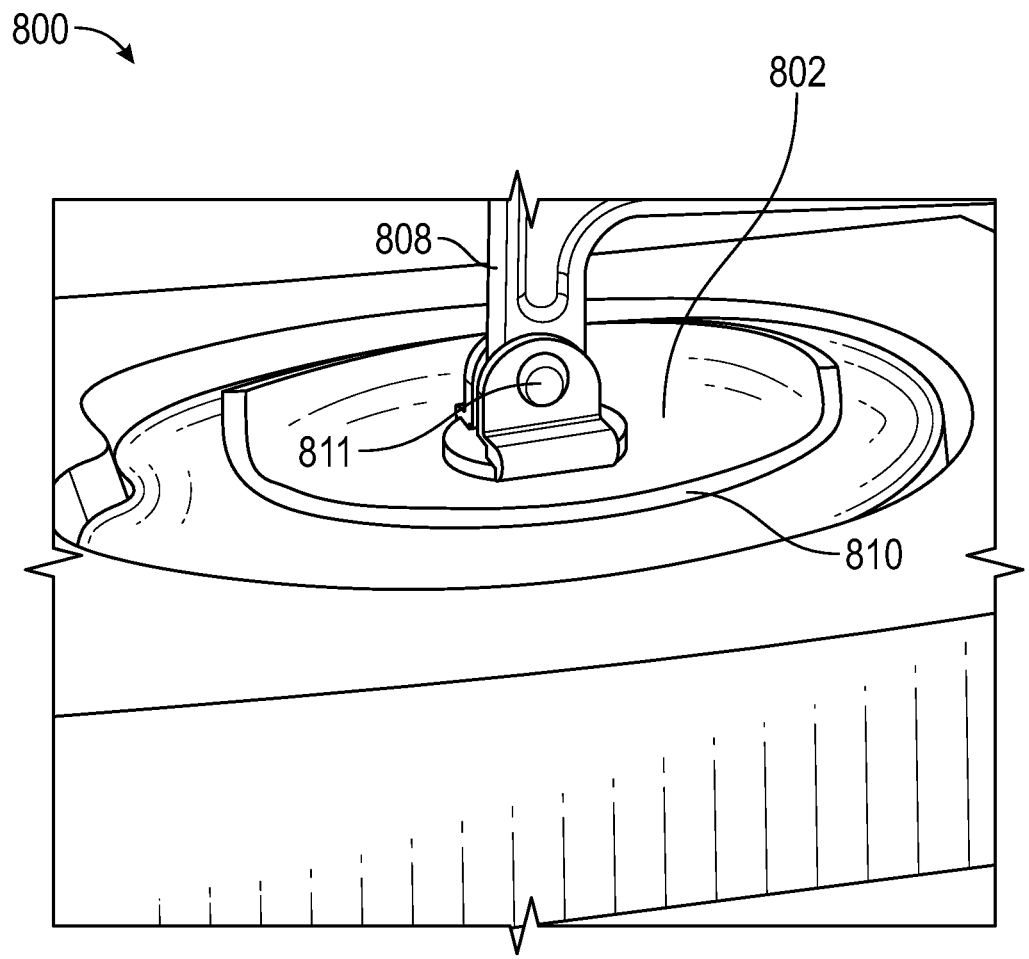
FIG. 8 is a closeup view of yet another device, similar to that of FIG. 7, but the stop has been switched out for a much larger one, sized and shaped to fit a particular shoe. With this embodiment, a single press is needed since the stop is shaped to provide the exact contours needed for a given shoe.

In still another embodiment, the stop itself is provided in a variety of sizes, one for each shoe size, as shown in FIG. 8 where stop 810 is much larger. This makes the shaping of the shoe much faster, since a single press can shape the entire shoe. In such instance, it may be useful to motorize the plunger so that less effort by the farrier is needed. However, the manually activated device will be less expensive, and may be preferred.

These devices can be provided in a kit, containing at least an entire device, but preferably including the base unit, platforms having an array of shoe shaped depression sizes, and a variety of stop shapes and sizes. Other kit materials may include instructions for use, lubricant for parts, replacement parts, a oven, a cold water bath, and the like.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

Each of the following are incorporated by reference in its entirety for all purposes.

| | |
|---|---|
| U.S. Pat. No. 10,206,386 | Equine shoe |
| U.S. Pat. No. 10,375,946 | Reduced weight equine orthotic pad and method |
| U.S. Pat. No. 10,548,304 | Equine shoe |
| US2011067366 | Rocker Attachment for an Equine Boot Assembly |
| US2016250078 | Equine Leg Cast Rocker Attachment |
| US2017027150 | Medication Rocker Shoe and Method |
| US2019069514 | Equine Rocker Shoe |
| US2021400942 | Equine Shoe Metal/Polymer Assembly |
| U.S. Pat. No. 9,770,018 | Rocker shoe and attachment for an equine boot assembly |
| USD728867 | Equine boot sole plate |
| USD746519 | Equine boot ridged orthotic pad |
| USD838059 | Rocker attachment for equine boot |
| USD897052 | Equine shoe |
| USD913605 | Equine rocker shoe |
| USD940967 | Equine shoe |
| USD968035 | Equine shoe |

The invention claimed is:

1. An apparatus for shaping a polymeric equine shoe, said apparatus having:
    a) a base;
    b) a platform attached to said base, said platform having an equine shoe shaped depression on an upper surface thereof, said equine shoe configured to cover an entire underside of a hoof;
    c) a lever arm operably affixed to said base and configured to depress a plunger ending in a stop when activated, said stop configured to press a concave upper surface into a center of a separate equine shoe placed in said depression, said plunger and stop positioned above and inside said depression when said lever arm is in a resting position, and said stop reaching a surface of said depression when said lever arm is activated.

2. The apparatus of claim 1, wherein said plunger is positioned in a slot in said lever arm and can be shifted back and forth along said lever arm, thereby adjusting a position of said plunger and said stop.

3. The apparatus of claim 1, wherein said stop comprises rubber or polyurethane.

4. The apparatus of claim 1, wherein said platform is reversibly attached to said base, and said apparatus includes a plurality of platforms, each platform having a different sized equine shoe shaped depression.

5. The apparatus of claim 1, wherein said stop is reversibly attached to said plunger, and said apparatus includes a plurality of stops, each stop having a different size and/or shape.

6. The apparatus of claim 1, wherein said lever arm is operably connected to a motor, and activating said motor activates said lever arm.

7. A method of shaping a polymeric equine shoe, said method comprising:
    a) heating a polymeric equine shoe configured to cover an entire underside of a hoof and having a topside and a bottom side to a malleable point without melting said equine shoe and placing said heated equine shoe into the depression of the apparatus of claim 1;
    b) pressing the plunger and stop of the apparatus of claim 1 into a center area of the topside of said equine shoe to form a shaped equine shoe that has a concave top surface;
    c) rapidly cooling said shaped equine shoe to fix its shape.

8. The method of claim 7, where said equine shoe comprises polyurethane.

9. The method of claim 7, where said bottom side of said equine shoe is convex.

10. The method of claim 7, said method including step b2), wherein said equine shoe is compared to a rocker trimmed equine hoof and said equine shoe is adjusted if needed for better fit against said rocker trimmed equine hoof.

11. The method of claim 9, wherein steps a), b) and b2) are repeated as needed.

* * * * *